United States Patent [19]
Steckel

[11] Patent Number: 6,085,135
[45] Date of Patent: Jul. 4, 2000

[54] METHOD FOR AGRICULTURAL MAP IMAGE DISPLAY

[75] Inventor: Thilo Steckel, Harsewinkel, Germany

[73] Assignee: CLAAS KGaA, Harsewinkel, Germany

[21] Appl. No.: 09/025,545

[22] Filed: Feb. 18, 1998

[30] Foreign Application Priority Data

Feb. 20, 1997 [DE] Germany .................. 197 06 614

[51] Int. Cl.$^7$ .................. G08G 1/123; G06F 19/00
[52] U.S. Cl. .................. 701/50; 340/988; 340/995; 345/113; 701/208; 701/212
[58] Field of Search .................. 701/1, 36, 50, 701/200, 207, 208, 212, 213, 300; 340/988, 990, 995; 345/112, 113, 114

[56] References Cited

U.S. PATENT DOCUMENTS

| | | | |
|---|---|---|---|
| 4,630,773 | 12/1986 | Ortlip .................. | 239/1 |
| 5,220,876 | 6/1993 | Monson et al. .......... | 111/130 |
| 5,757,640 | 5/1998 | Monson ............... | 701/50 |
| 5,870,686 | 2/1999 | Monson ............... | 701/50 |
| 5,938,709 | 8/1999 | Hale et al. ............ | 701/50 |

FOREIGN PATENT DOCUMENTS

| | | |
|---|---|---|
| 0635960A1 | 1/1995 | European Pat. Off. . |
| 2936062C2 | 3/1981 | Germany . |
| 3801888A1 | 8/1989 | Germany . |
| 4306640A1 | 9/1994 | Germany . |
| 4345274C2 | 9/1994 | Germany . |
| 4438662C2 | 5/1995 | Germany . |

*Primary Examiner*—William A. Cuchlinski, Jr.
*Assistant Examiner*—Edward Pipala
*Attorney, Agent, or Firm*—Husch & Eppenberger, LLC; Robert E. Muir

[57] ABSTRACT

A method for program-controlled display of an electronic map image on a screen (S) of an agriculture machine (AV), which includes a position finding system (GPS) and a screen operating computer (SOC) which has access to map information (MI) directly or via a radio data transmission channel (RC, RRC). The map information (MI) is accessed as a function of the machine location (LI) determined at any given time and is processed for a map image display. The map information (MI) contains driving and/or cultivation data of the land to be driven over or cultivated and these data are processed automatically selectively into the respective location-related map image display, in each case as a function of respective operating parameters (DT, VS, LPS, PS, EI) of the machine.

26 Claims, 3 Drawing Sheets

METHOD FOR AGRICULTURAL MAP IMAGE DISPLAY

BACKGROUND OF THE INVENTION

The present invention relates generally to agriculture and, more particularly to a method for program-controlled display of an electronic map image on a screen of an agricultural machine.

It is known that on-highway vehicles can have a computer screen for display of a segment of a road map. Some have a location indicator and a navigation aid pointer. The road map information is stored in electronic memory which is accessible in the vehicle, or externally by radio. The position finding pointer is entered in the road map image according to the position finding data which have been continuously obtained from a position finding system receiver arranged in the on-highway vehicle, e.g. a GPS, the road map segment being selected in each case to match the position finding data. The navigation aid pointer points in each case in the direction of road travel to be taken, which is recommended according to a preselected route.

For equipment used in agriculture, in particular farm machinery, the above-described method of operating a cartographic screen display can possibly be used for road travel, but it fails in open country and on farmland.

From EP 0635960 A1 it is known that several computers can be connected by a data transmission network to a central computer, wherein the individual computers contain agricultural cartographic data banks and the central computer collects general cartographic data bank information and keeps it on standby for scanning.

It is an object of the present invention to provide a cartographic screen display as a navigation aid, in particular for equipment for agricultural use and farm machinery, which assists optimum possible navigation and optimum possible operation in open country and farm land.

It is desirable to provide a method that overcomes one or more of the deficiencies noted above.

SUMMARY OF THE INVENTION

The solution lies in that the map information contains driving and/or cultivation data of the land to be driven over or cultivated and these data are processed automatically selectively into the respective location-related map image display, in each case as a function of at least one operating parameter of the machine.

In accordance with the present invention there is provided a method for a program-controlled display of an electronic map image on a screen of an agricultural machine, which includes the steps of determining the machine location from a position finding system, accessing as a function of the machine location map information containing data of the land to be traversed, sensing operating parameters of the machine, processing the data as a function of at least one of the operating parameters to automatically select the related map image display information, and displaying the map image display on the screen.

The machine includes a position finding system for determination of the respective machine location and an orientation system for determination of the respective direction of travel thereof and a screen operating computer which has access to map information directly and/or via a radio data transmission channel and accesses it as a function of the machine location determined at any given time and processes it for map image display, in which are entered in each case a location indicator and if occasion arises navigation information.

BRIEF DESCRIPTION OF THE DRAWINGS

Reference is now made to the drawings which illustrate the best known mode of carrying out the invention and which show a system and examples for putting the method into practice.

DETAILED DESCRIPTION

Figure 1:
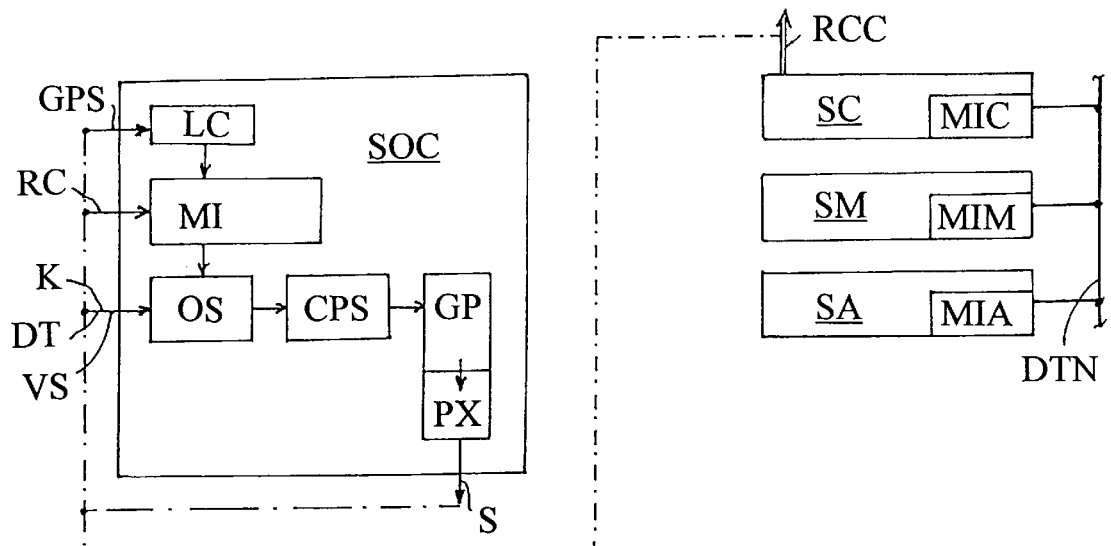
FIG. 1 is a diagrammatic illustration of an agricultural machine with an information system.
Figure 1:
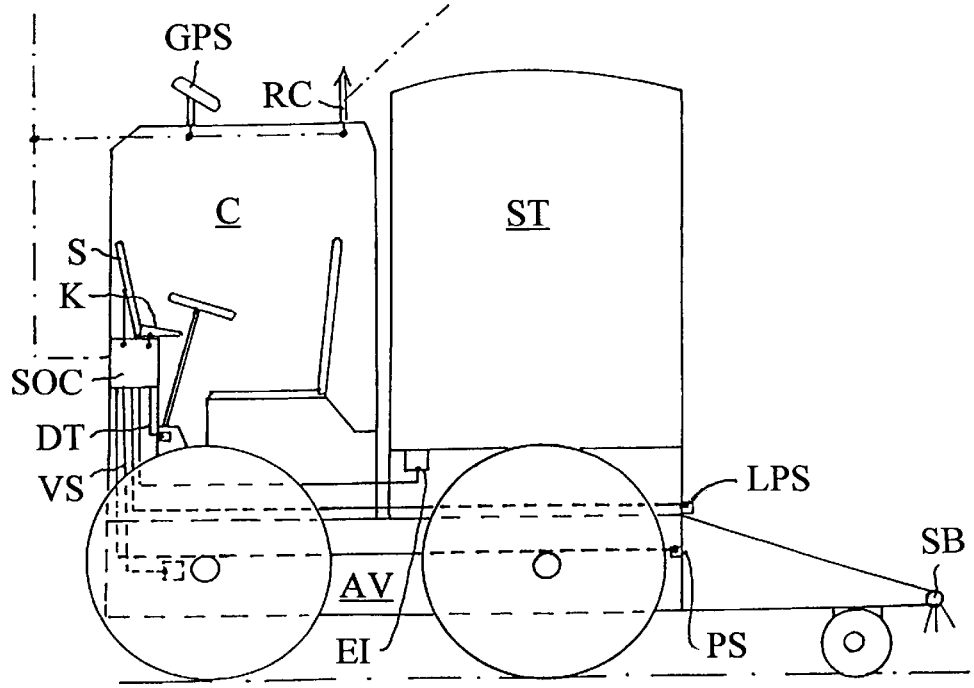

The agricultural machine (AV) in FIG. 1 is, for example, an implement carrier with an operator's compartment or cab (C), a spray tank (ST) and a pivotable spray bar (SB). In the cab (C) a screen (S) and a keyboard (K) are arranged in front of the operator's seat. A screen operating computer (SOC) is shown schematically. It contains a graphics processor (GP) which drives the screen (S). The operating computer (SOC) receives control instructions from the keyboard (K); a machine speed signal (VS) from the chassis of the machine (AV); a direction of travel signal (DT) from a direction sensor (not shown); and signals from the implement. For example, implement mode signals such as equipment information (EI), a lift position signal (LPS) and/or a power-take-off shaft speed (PS), are passed to the operating computer (SOC).

The operating computer (SOC) also receives position finding signals of a global positioning system (GPS) which works in a known manner by means of satellite signals and earth station signals and continuously indicates coordinates, altitude and direction. These GPS signals are used in the operating computer (SOC) for determining the respective location coordinates (LC) which serve for addressing the memories of the map information (MI, MIM, MIA, MIC). The map information includes data about the land such as highways, strip and field boundaries, contour lines, any obstacles to be observed with respect to driving such as ditches, bogs and water surfaces that cannot be driven on; as well as protruding objects such as walls, hedges, and barns. The map information also includes altitude or gradient data as well as agricultural data such as type of crop, degree of ripeness, states of cultivation, etc.

Preferably a digitally stored topographic map is the starting base which is aligned with known GPS coordinates at prominent points such as road intersections and buildings. All further map information specific to the state of buildings and cultivation is kept processed in any number of layer files after the fashion of multilayer technology. The individual layers are assigned to special subjects, particularly certain operative states of the cultivation implements. For example, in each layer are stored the strip boundaries, the roads, the cultivation, the contour lines, the gradients, the plantings, water, the crop yield, the state of fertilizing, the soil moisture, etc. Also certain combinations of such map overlay layers can be kept stored in an auxiliary layer, which saves processing time in case of frequent access. The nature of the boundary lines and obstacles are in each case marked by symbols in the map display or linked to field names or the like. During cultivation, moreover, the boundary of the field areas already cultivated with the uncultivated area is supplied, for which purpose the respectively cultivated areas are detected continuously in a known manner and filed ready to be recalled from the map data memory (MI).

This map information is stored in the operating computer (SOC) itself and/or at external stations (SM, SA, SC). The external stations are, for example, a meteorological station (SM), an agricultural sciences station (SA), and a central station (SC) which serves as the base station or host computer. These stations or computers (SM, SC, SA) communicate with each other via a data transmission network (DTN). Communication of the central station (SC) with the operating computer (SOC) is via a radio data transmission channel (RC-RCC).

To offer the operator continuously guide information which as far as possible is adapted to the operating conditions, the comprehensive information supplied for the map display is used selectively. For example, the information is thematized; i.e. for on-highway journeys road map information is selected and for off-highway journeys the terrain information relevant therefor is selected and processed. Furthermore this information is selected as a function of a choice made by the operator or other observer and, in particular, automatically as a function of operating or driving parameters, and is displayed in condensed or highlighted form. For instance, for selection of the map details a hoisting gear position (as sensed by LPS), a respective power take-off shaft speed (PS), a final speed preselection, a gear lever position (such as sensed by DT) or the like is determined and processed for the output to the image on screen (S).

According to the mosaic of the map image to be displayed at a given time, in the region of the respective location coordinates (LC) the land register information of stored terrain information is read out and linked to the contents of the color, pictorial symbols and symbol memory (CPS), controlled by the contents of the operative state memory (OS), and fed by a pixel memory (PX) to the screen (S). The operative state is formed from the keyboard (K) inputs, the machine speed signal (VS) and further operation and status messages of the machine (AV) and implement such as the lift position signal (LPS) of the spray bar (SB), the power take-off shaft speed (PS), and the equipment information (EI). From this a working and turning process, the working width, etc. can be inferred and hence the choice of image information can be determined in a controlled fashion.

In the map image are advantageously inserted operating data in each case predetermined according to the data banks and to be adjusted manually, particularly where the speed of driving or machine speed (VS), a discharge quantity as at spray bar (SB), the cutting height (SH), etc. is to be altered or a work status is to be altered.

Figure 2:
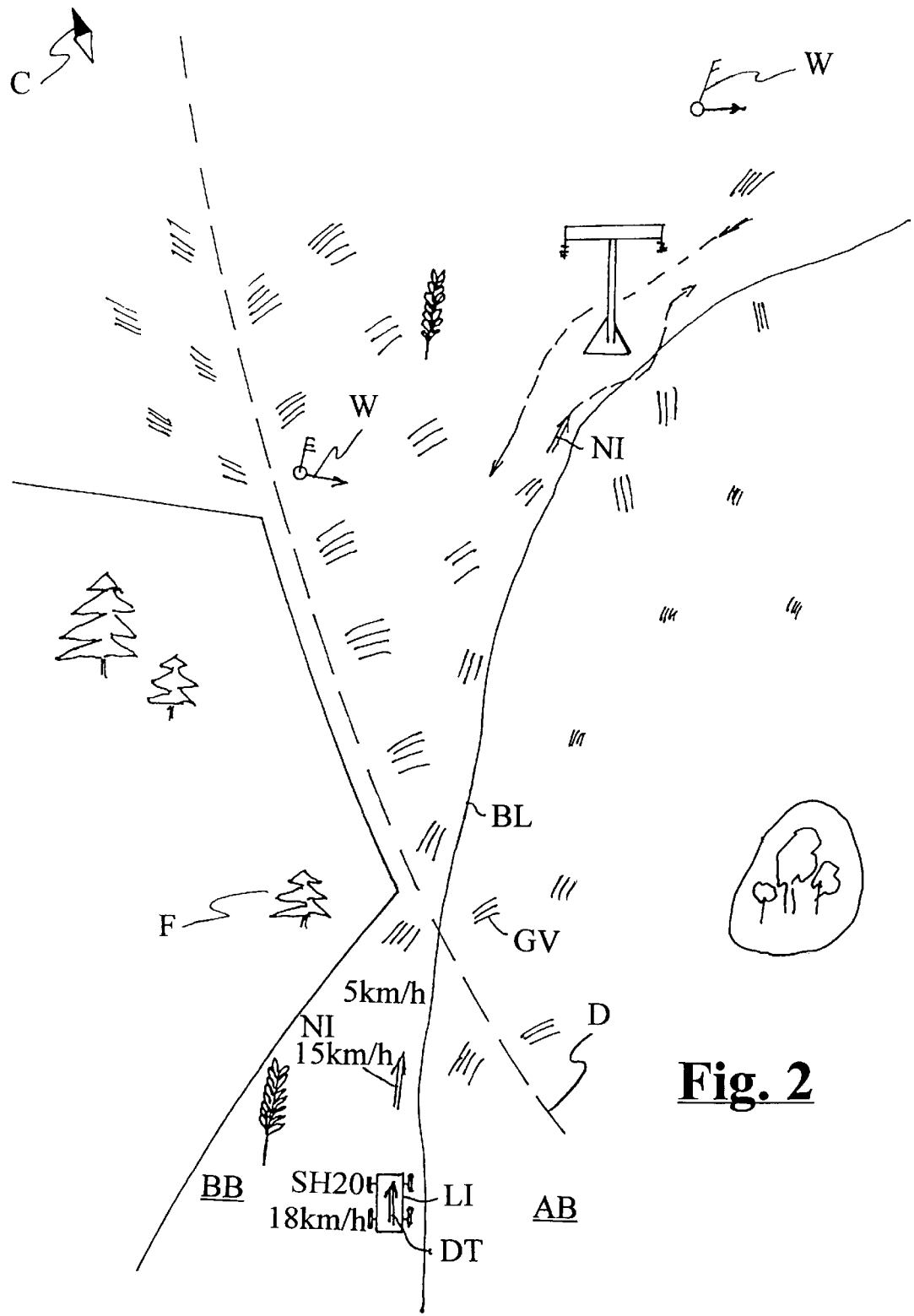
FIG. 2 is a schematic illustration of an off-road map display.

FIG. 2 is a schematic of a terrain drawing that may be shown on the screen (S), near the lower edge of which a machine symbol is displayed as a location indicator (LI). The machine symbol carries a direction of travel pointer (DT) which points upward because of the map orientation. On the terrain can be seen a boundary line (BL) of a field where a section (AB) which is already cultivated lies to the right of the route to be taken. The route is marked by navigation information (NI) symbolized as a double arrow with the instantaneous machine speed of 15 km/h. The lines to be displayed, which are preferably stored as vector data, also are appropriately provided with relevance factors, so that depending on the selected scale more or less significant lines, e.g. 20 m. contour lines, 10 m. contour lines, etc., are displayed in each case with increasing detail. Naturally topologies stored in mosaic form can also be converted accordingly. Gradient vectors (GV) show rough terrain and the course of a ditch (D), in front of which is a speed limit indication, i.e. 5 km/h. Next to the machine symbol (LI) is given the instantaneously recommended cutting height (SH) at 20 cm. and the maximum speed limit of 18 km/h.

Furthermore, available meteorological data are entered in cartographically processed form in the image display as far as they are relevant to the cultivation planned at any given time. Particularly in spraying work or in sowing seeds the wind direction is significant, and in harvesting work the soil moisture is critical for the work quality, and therefore beneficially displayed. On the basis of this map information the operator can select a favorable direction of travel (DT) and a favorable route, wherein e.g. the drier field areas are driven over first, so that the wetter ones can be drying until cultivation.

In FIG. 2 a symbolic compass needle (C) shows north and wind direction pointers (W) show the local force and direction of the wind. The woods symbolized by the fir tree pictorial symbol (F) next to a field to be cultivated (BB) direct the wind to an increased extent toward the northern end of the field, which is shown by the wind direction pointers (W).

Figure 3:
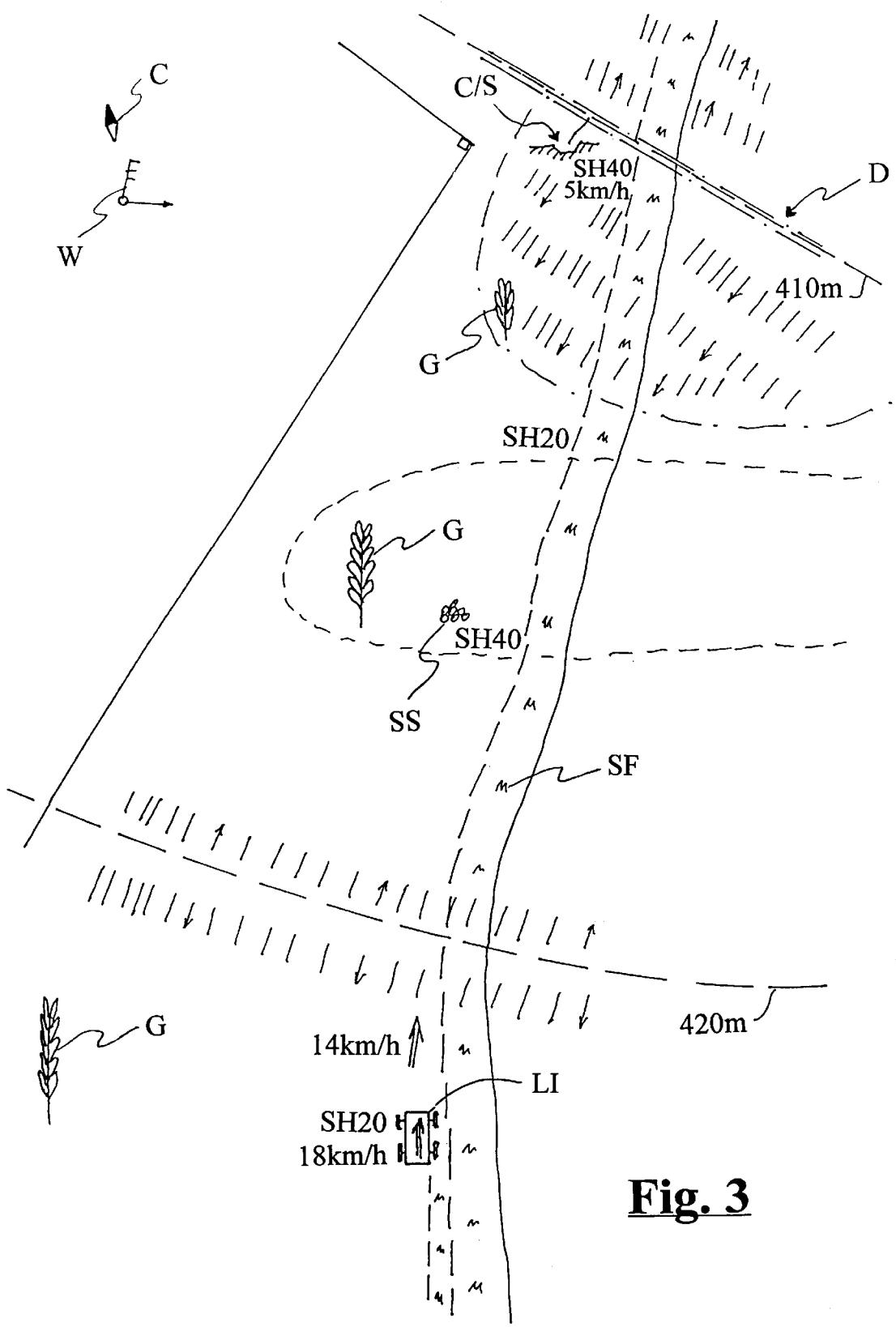
FIG. 3 is an enlarged segment of FIG. 2 for use at lower travel speed.

The map scale is selected as a function of the driving speed in such a way that at higher speed a layer overview of a larger map segment with less attention to detail is shown, and at lower speed a greatly enlarged segment with minute details is shown. FIG. 3 shows the map segment at a lower driving speed which is given as 14 km/h, and leads to an enlargement of the map segment so that more details are given. These details include additional gradient vectors (GV), contour lines with altitude data, already cultivated areas shown as stubble field (SF), and a stony field area symbolized by a heap of stones (SS) and with a recommended greater cutting height (SH) of 40 cm. The cross-section of the ditch (D) located over 410 mm is displayed symbolically at "C/S". The west slope of the ditch has a lower yield value and lower stem height, which is symbolized by the smaller grain symbol (G). The cutting height (SH) is accordingly indicated at 20 cm. lower than given on the adjacent stony land.

The data contained in known cultivation maps to be used technically and obtained from so-called yield maps, on the quantities of fertilizers, sprays or the like to be applied to the individual pieces of farmland are, as far as they are available, cartographically displayed in general only to the limited extent as far as they are used for automatic or manual control, as the abundance of data presented to the operator on screen would be more hindrance than help.

Another way of simplifying information for the general map display is to suitably reduce the abundance of data of the all-encompassing detailed display by a compression algorithm according to the scale.

As far as a cultivation plan relating to the sequence of cultivation strips to be covered is prepared in a cultivation map file, the map information to be displayed is appropriately always displayed only for one area along the strip driven over at any given time, possibly together with limited neighboring area information.

As shown in FIG. 3, during cultivation the boundary with the cultivated field area is especially highlighted in particular when cultivation leaves no clearly visible traces, e.g. when applying sprays. The width of the cultivated strip behind the machine symbol (LI) is shown true to scale and in reality e.g. 8 m. wide. The operational and driving data are placed only along the route of cultivation. The topology, the path, the soil properties and the yield situation as well as the wind data are in each case superimposed from the various specific files. The files and data are interpreted for a selected agricultural machine, e.g. for a harvester the data is converted to speed limit and cutting height recommendations.

The displays of the cartographic objects and the marking of the different kinds of information are done in the image preferably in different colors (not shown) and/or with pictorial symbols (C, F, G, W, SS) or with structuring, contour lines, gradient vectors (GV), etc. The pictorial symbols are stored in a file and added to the image by instructions which are contained in the map memories. These instructions are appropriately linked to selection and/or relevance codes which indicate in which operative states and/or from which map scale onwards they are respectively to be taken into consideration. Hence it is easy to provide the general maps with small indications and the segment maps increasingly with details, as shown in FIG. 3.

To simplify the operator's orientation on the displayed map image, his alignment on the screen is appropriately coordinated with the respective direction of travel (DT), and the respective image segment is determined according to the location of the machine (AV), so that essentially the section of land to be driven over immediately following is clearly visible. At its simplest, therefore, the machine symbol (LI) itself can be seen in the lower or central region of the image and the direction of travel (DT) is oriented upwardly, as shown in FIGS. 2 and 3.

Further, an improvement of orientation in the region of a turning loop is achieved by the fact that the whole turning area, the preliminary turn, is shown in the same display during each turning maneuver and the machine location (LI) and direction of travel (DT) are in each case indicated continuously therein. Not until completion of turning is the new cultivation strip to be driven over shown in the map image, oriented from bottom to top, whereupon the image segment is displayed stepwise or quasi-continuously as a function of the speed of travel. Appropriately the information of the general map and of the respective map segment is kept available, processed in quasi-parallel form, so that it is possible to switch between the two map images in case of need without requiring a longer time if the operator thinks necessary and initiates it or a preselected switching rate is traversed.

If the data needed for display, e.g. weather map data, cultivation data, topography data, etc., are supplied in different files at external stations (SC, SM, SA), they are either called up by the screen operating computer (SOC) on the machine (AV) by radio data link (RC-RCC) from the stations (SC, SM, SA), selected in a form specific to type, or collected via the central station (SC) and then transmitted to the machine (AV). The data from the various files are combined either in the screen operating computer (SOC) or at the central station (SC). On transmission the data are appropriately compressed, and then expanded in the screen operating computer (SOC) by means of an image processing program by coding of colors, conversion of vectors (GV) and insertion of graphic signs and pictorial symbols from the associated auxiliary files in a known manner. Suitable programs for these process steps and in certain circumstances hardware that can be used to carry them out are in general referred to as graphics postprocessors (GP).

Digitally stored map displays reproduce the space covered only as a model. As they reproduce reality only to a limited extent, they are appropriately thematized. In general a mosaic display of the horizontal surface projection is chosen, information on the conditions there being stored in the picture elements, e.g. the altitude, the course of a boundary, the type of surface, etc. Alternatively or in addition vectors of descriptive function lines or gradient vectors (GV) of properties are stored.

Advantageously a 3-D terrain data bank or a digital aerial map file can also be used as a data base. With sufficient processor capacity a scene close to reality can be calculated therefrom and generated and presented on screen as seen from the point of view of the operator or other observer position. In order to increase the closeness to reality, advantageously the gradient of the terrain at the machine location (LI) is taken into consideration according to the data bank information or according to gradient sensor data on the machine (AV) on generation of the scene by corresponding revolving coordinate transformations.

Depending on the mode of operation, e.g. the speed of travel, the power-take-off shaft speed (PS), the hoisting gear position, the gear selection, etc., which are continuously determined on the machine (AV), only certain information is relevant to the display. Therefore for example during road driving the courses of roads and traffic information as well as the fitness of roads for driving are selected out of the abundance of data, but during off-road driving information on soil cultivation, on the route and course of the boundary, on the course of the terrain and on soil properties as well as if occasion arises weather information are selected; details on the road network are however irrelevant off road and are excluded from the display.

On account of data transmission between the computer stations (SOC, SC, SM, SA), the data of the image presented at any given time can also be transmitted to other stations, e.g. to the host computer (SC), and made visible there so that operational problems can be realistically assessed there and instructions for correction can be given to the operator by radio or added to the image on the screen (S).

As used herein, the terms "map information" or "map data" are intended to include information about the area and is not intended to be limited to topographic information; rather it includes road conditions, weather conditions, crop conditions and type, cultivation status, and other work related or agriculture related information.

Other objects, advantages and features of the invention may be perceived by those skilled in the art or from the appended claims.

I claim:

1. In a method for a program-controlled display of an electronic map image on a screen of an agricultural machine, which includes the steps of determining the machine location from a position finding system, determining the direction of travel of the machine, accessing map information as a function of the machine location, processing the map information and displaying on the screen a map image of the area of the machine location, the improvement comprising:

accessing map information containing data of the land to be traversed, sensing operating parameters of the machine, processing the data as a function of at least one of the operating parameters and automatically selecting the related map image display.

2. A method according to claim 1, including the step of: storing in computer memory map information comprising courses of roads, data on fitness of roads, boundary lines, obstacles, terrain data, altitude data, gradient data, crop type, degree of crop maturity, and cultivation status.

3. A method according to claim 1, including the step of: storing in computer memory machine settings for cultivation of the land being traversed comprising speed limits, quantity of material to be discharged, and route information.

4. A method according to claim 1, including the step of: storing in computer memory current local meteorological data comprising wind direction, soil moisture, and solar radiation.

5. A method according to claim 1, including the steps of: accessing the map information from any of several function-specific map data banks, and selecting and processing operation-related map images, and superimposing the map images under the control of operating parameters.

6. A method according to claim 5, characterized in that the map data banks are in several spatially separate stations which are linked by data transmission links to a screen operating computer on the machine, and including the step of accessing the map data banks via the screen operating computer as a function of mode and machine location.

7. A method according to claim 1, including the steps of: processing data concerning the courses of local roads and data on fitness of roads for traffic for the map image in an on-highway driving mode; processing data concerning boundaries, obstacles, types of terrain, altitude and gradient courses for the map image in an off-highway driving mode; and processing data from the available associated types of map and map data as a function of a predetermined cultivation mode and mode-specific operating parameters to be adjusted locally; and displaying the operating parameters comprising area-specific discharge quantities, driving speed, machine speed, cutting height, cultivation paths, directions of travel for cultivation, and preliminary turn information.

8. A method according to claim 3, including the steps of: cultivating as a function of operating parameters of the machine; sensing and storing the operating parameters in function-specific formation in a cultivation data bank; and, on a real-time basis, computing and displaying on the screen a cultivation boundary with the already cultivated land is continuously entered in the map image.

9. A method according to claim 8, wherein the step of: sensing and storing the operating parameters includes storing a measured driving speed, a respective working width, a hoisting gear position, a respective power take-off shaft speed, a final speed preselection, and a respective gear lever position.

10. A method according to claim 8, including the step of: collecting and storing crop yield and fertility map data in function-specific formation in the cultivation data bank.

11. A method for map image display on a screen of an agricultural machine including the steps of:

determining the machine location from a position finding system;

selecting at least one operating parameter related to machine speed and continuously feeding said operating parameter to a screen operating computer;

processing said operating parameter relating to machine speed and, as a function thereof and of machine location, automatically selecting map information from a data bank containing data about the land being traversed; and displaying selected cartographic objects on the screen.

12. A method of map image display according to claim 11, wherein the step of selecting at least one operating parameter includes selecting from a machine speed, a hoisting gear position, a power-take-off shaft speed, a final speed preselection, and a gear lever position.

13. A method of map image display according to claim 11, wherein the last-mentioned step comprises displaying cartographic objects on a scale that is inverse to speed so that the lower the driving speed, the larger the scale.

14. A method of map image display according to claim 11, including the steps of: linking the map information to a color, pictorial symbols and symbol data bank; and entering the colors, pictorial symbols and symbols in the map image at the positions corresponding to the map information.

15. A method of map image display according to claim 14, including the steps of: allocating relevance codes and selection codes in the map information and the color, pictorial symbols and symbol data bank; and establishing in which mode and as a function of which operating parameter the colors, symbols and other cartographic objects are to be entered in the map image display.

16. A method of map image display according to claim 15, including selecting the size of the symbols according to the scale of the display.

17. A method of map image display according to claim 11, including providing a graphics postprocessor for transforming the map image according to scale with the colors, lines, pictorial symbols and symbols from map information.

18. A method of map image display according to claim 11, including keeping the map image on the screen generally unchanged during each turning maneuver while continuously correcting an indicated machine location and a direction of travel display.

19. A method of map image display according to claim 11, including continuously feeding the screen operating computer direction of travel information; and continuously processing the map information in such a way that the direction of travel is oriented generally from bottom to top on the screen.

20. A method of map image display according to claim 19, including selecting the map image information relative to the machine location in such a way that the latter is located in the lower portion of the image on the screen.

21. A method of map image display according to claim 11, including overriding an actual operative state by an operating instruction and processing the map information according to another operative state.

22. A method of map image display according to claim 21, including the steps of: storing in each case a general map image and a map image segment selected according to the machine speed in processed form, and selectively displaying on the screen as a function of an operator instruction, one of the two map images.

23. A method of map image display according to claim 22, characterized in that one of the items of map information is a digitalized aerial image.

24. A method of map image display according to claim 22, characterized in that one of the items of map information is a digitally stored three-dimensional map information; and including converting the three-dimensional map information to a virtual reality terrain image as a function of the respective machine location and of the terrain gradient, and displaying said virtual image on the screen.

25. A method of map image display according to claim 11, including the step of transmitting the respective map or terrain image from the screen operating computer to another station.

26. A method for map image display on a screen of an agricultural machine including the steps of:

determining the machine location from a position finding system;

selecting at least one operating parameter related to machine speed and continuously feeding said operating parameter to a screen operating computer;

processing said operating parameter and, as a function thereof and of machine location, automatically selecting map information from a data bank containing data about the land being traversed;

displaying selected cartographic objects on the screen;

overriding an actual operative state by an operating instruction and processing the map information according to another operative state;

storing in each case a general map image and a map image segment selected according to the machine speed in processed form;

selectively displaying on the screen as a function of an operator instruction one of the two map images, one of the items of map information being digitally stored three-dimensional map information;

converting the three-dimensional map information to a virtual reality terrain image as a function of the respective machine location and of the terrain gradient; and displaying said virtual image on the screen.

* * * * *